Aug. 21, 1923.

T. W. FOSTER 1,465,548

POWDER CAKE HOLDER

Filed Feb. 28, 1923

INVENTOR
Theodore W. Foster

BY Joseph A. Miller

ATTORNEY

Patented Aug. 21, 1923.

1,465,548

UNITED STATES PATENT OFFICE.

THEODORE W. FOSTER, OF PROVIDENCE, RHODE ISLAND, ASSIGNOR TO THEODORE W. FOSTER BROTHERS COMPANY, OF PROVIDENCE, RHODE ISLAND.

POWDER-CAKE HOLDER.

Application filed February 28, 1923. Serial No. 621,788.

*To all whom it may concern:*

Be it known that I, THEODORE W. FOSTER, a citizen of the United States, residing at Providence, in the county of Providence and State of Rhode Island, have invented new and useful Improvements in Powder-Cake Holders, of which the following is a specification.

This invention relates to certain new and useful improvements in powder cake holders, and pertains more particularly to a holder for cakes of powder that are usually carried in ladies' vanity cases.

The primary object of the invention is to provide a powder cake holder which not only effectively holds the cake, but which also enables the cake to be easily and quickly removed and a fresh cake substituted therefor.

A further object of the invention is to provide a device of this type which is of simple and economical construction and which is devoid of any part or parts likely to be easily deranged or rendered inoperative.

The invention has still further and other objects which will be later set forth and of themselves manifested, in the course of the following description.

Figure 1:
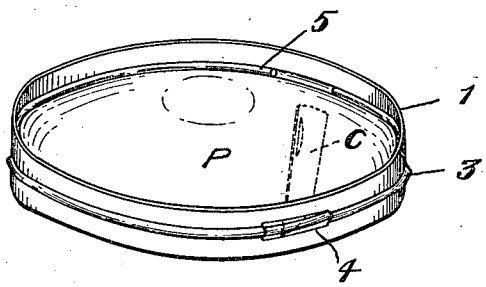
Figure 1, is a perspective view of the invention showing a knife blade in dotted lines in the act of removing the spring lock.

In proceeding in accordance with the present invention a circular casing 1 is employed having a bottom 2 which latter may be cut away at its center as indicated at 6. The rim or bounding wall of the casing is formed with a hollow bead 3, which latter is cut away as indicated at 4, the cutaway portion extending out for a short part of the circumference of the bead.

The cake or powder indicated at P in the drawings is supplied by the manufacturer mounted upon an aluminium base B, of disk form, the upper face of the powder cake usually being of convex or dome-like contour, as depicted in the drawings. The aluminium base B of the powder cake seats upon the bottom 2 of the casing, the bead 3 opening into the casing interior and being located at such distance above the casing bottom 2 so as to cause the part of the upper surface of the powder case adjacent to the rim 1 to be in substantial register with the hollow interior of the bead. A split spring wire ring 5 is employed of a diameter and gage to be received within the casing rim and to project within the hollow interior of the bead 3 and to seat upon the upper surface of the powder cake P. With the parts assembled as above described the structure appears as in Figures 1 and 2 of the drawings and is then ready to be carried in a vanity case or otherwise as desired.

Figure 2:
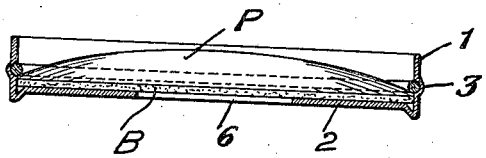
Figure 2, is a diametrical sectional view of Figure 1.
Figure 3:
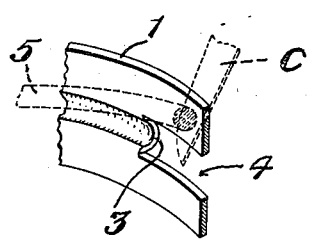
Figure 3, is an enlarged fragmentary view illustrating the removal of the lock, in dotted lines.

For the purpose of removing a worn cake, and substituting a fresh cake, a sharp instrument, such as a knife blade C may be employed, which is inserted from the interior of the casing at a point in register with the cut-out 4, the cut-out as depicted in Figures 1 and 3 of the drawings extending above and below the bead 3, so as to permit the point of the knife blade to be inserted between the rim 1 and the spring wire 5, to thereby pry or move the spring wire upwardly out of the bead 3, following which the entire spring ring may be easily removed from the casing.

From the foregoing it will be seen that the device embodies but one movable element namely the spring ring, and that the cut-out permits the spring ring to be easily and quickly removed, and upon removal the open center 6 of the casing bottom 2 permits the powder cake to be moved out of the casing in an easy and quick manner.

Having thus described my invention what I claim as new and desire to secure by Letters Patent is:—

1. In a powder cake holder, a circular casing having a bottom formed with a central opening and having a rim formed with a circular bead which is hollow and which opens into the casing interior, said bead being formed with an approximately rectangular cut-out which extends beyond the top and bottom of the bead, and a split spring wire ring engageable in the bead and extending across the cut-out and in spaced relation to the top and bottom walls defining the cut-out.

2. In a powder cake holder, a casing of circular form having a circular hollow bead in its rim opening into the casing interior, said bead being formed with a cut-out, and a split spring wire engaging in the hollow interior of the bead and extending across the cut-out, the part of the wire in register with the cut-out being spaced from the wall defining the top of the cut-out.

3. In a powder cake holder, a casing of circular form having a circular hollow bead in its rim opening into the casing interior, said bead being formed with a cut-out, and a split spring wire engaging in the hollow interior of the bead and extending across the cut-out.

In testimony whereof I have signed my name to this specification in the presence of two subscribing witnesses.

THEODORE W. FOSTER.

Witnesses:
E. L. FULLER,
L. W. FITCH.